United States Patent [19]

Tomasi

[11] Patent Number: 4,558,322
[45] Date of Patent: Dec. 10, 1985

[54] RADAR SYSTEM OPERATING BY MEANS OF FREQUENCY MODULATED PULSED WAVES

[75] Inventor: Jean-Pierre Tomasi, Velizy, France

[73] Assignee: U.S. Philips Corporation, New York, N.Y.

[21] Appl. No.: 332,985

[22] Filed: Dec. 21, 1981

[30] Foreign Application Priority Data

Dec. 19, 1980 [FR] France ................. 80 27041

[51] Int. Cl.[4] ................. G01S 7/28
[52] U.S. Cl. ................. 343/17.2 R; 343/14
[58] Field of Search ........... 343/5 R, 12 R, 17.2 PC, 343/17.2 R, 5 PN, 14

[56] References Cited

U.S. PATENT DOCUMENTS 3,727,222  4/1973  Hollis ................. 343/17.2 PC
4,142,189  2/1979  Gleason ................. 343/9
4,219,817  8/1980  Moore et al. ................. 343/17.1 PF Primary Examiner—Salvatore Cangialosi
Assistant Examiner—K. R. Kaiser
Attorney, Agent, or Firm—Thomas A. Briody; William J. Streeter; Leroy Eason

[57] ABSTRACT

A radar system operating by means of frequency-modulated pulsed waves comprises an aerial system for directing such waves to at least one target located at a distance D and for receiving the waves reflected from said target, a mixer circuit having a first input for receiving a local signal, a second input for receiving the reflected signal received by the aerial system, and an output for producing information about the distance D, a frequency-modulated (FM) wave generator, a change-over device cooperating with a control circuit for temporarily connecting the FM wave aerial system to the generator, while the first input of the mixer circuit receives a signal derived from the output signal of the FM wave generator by means of a coupler. The control circuit comprises means for connecting the aerial system to the output of the FM wave generator during one of equal fixed time durations selected in a pseudo-random manner within a time interval of a fixed duration.

2 Claims, 7 Drawing Figures

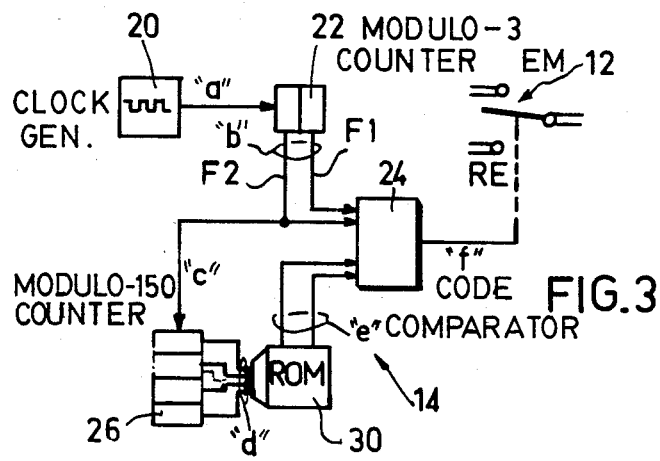
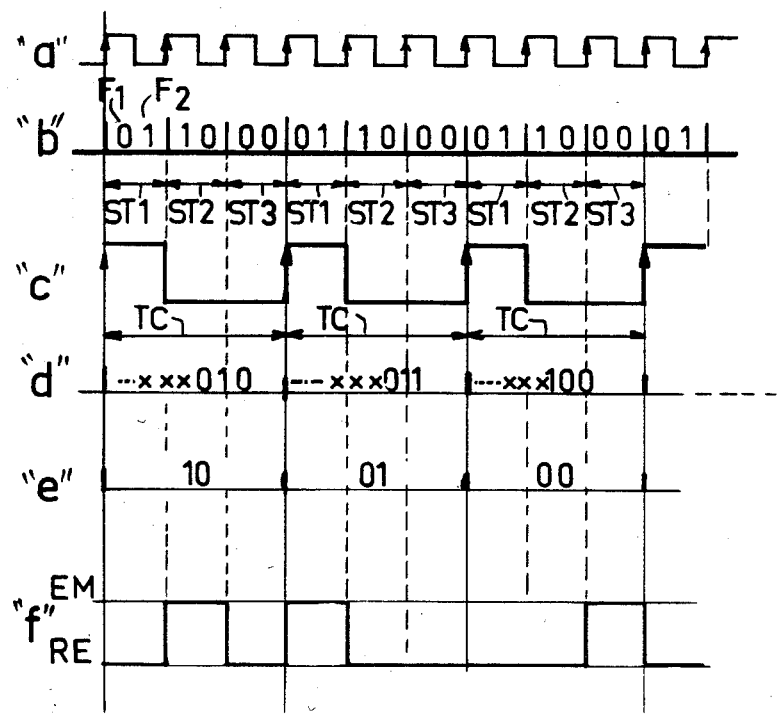

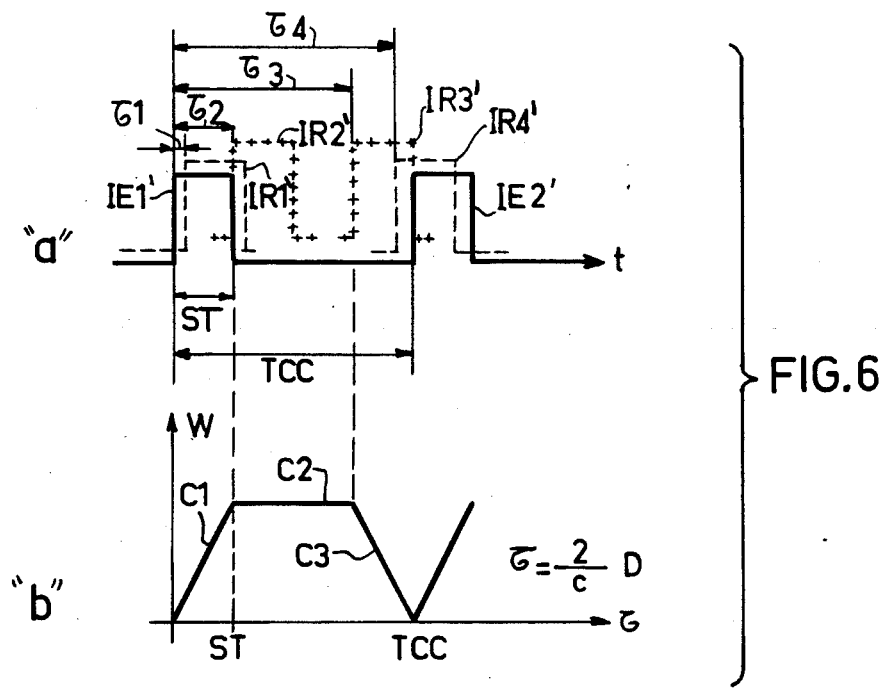
FIG. 6
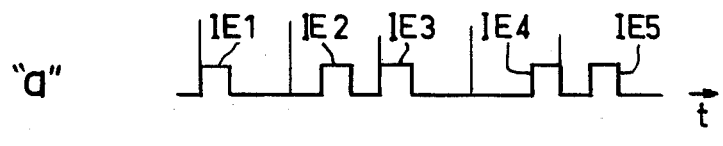
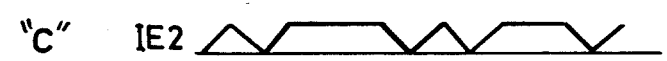
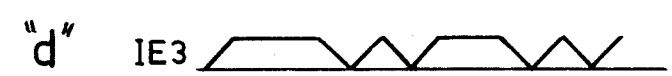
FIG. 7

RADAR SYSTEM OPERATING BY MEANS OF FREQUENCY MODULATED PULSED WAVES

BACKGROUND OF THE INVENTION

1. Field of the Invention

The invention relates to a radar system operating by means of frequency modulated pulsed waves, comprising an aerial system for directing these waves to at least one target located at a distance D and for receiving the waves reflected from this target, a mixer circuit having a first input for receiving a local signal, a second input for receiving the reflected signal received by the aerial system and an output for producing information about the distance D, a frequency-modulated wave generator, a change-over device co-operating with a control circuit for temporarily connecting the aerial system to the generator and for thus producing the pulsed waves, while the first input of the mixer circuit receives a signal which is derived from the output signal of the generator.

2. Description of the Prior Art

A system of this type is disclosed in U.S. Pat. No. 3,883,871. In the system disclosed there, the waves are transmitted at regular time intervals T, so that a target situated at a distance DA such that: $DA = 2 cT$, wherein c is the speed of light, cannot be detected because the wave reflected from this obstacle arives at the aerial system of the radar at the moment it transmits; consequently the reflected waves cannot be applied to the mixer circuit.

SUMMARY OF THE INVENTION

The invention has for it object to provide a system of the type disclosed in the opening paragraph which does not have this disadvantage and which can measure the distance of targets located over a wide range of distances.

To that end, such a system is characterized in that the control circuit comprises means for connecting the aerial system to the output of the FM wave generator during certain fixed time durations of equal selected in a pseudo-random manner within a time interval of a fixed duration.

By means of the following description which is given by way of non-limitative example, it will be better understood how the invention can be put into effect.

BRIEF DESCRIPTION OF THE DRAWINGS

FIG. 3 shows in detail the embodiment of a control circuit which is part of the device shown in FIG. 1.

FIG. 4 shows different signals generated in the control circuit of FIG. 3.

FIG. 6 is a waveform diagram for explaining the variation of the level received as a function of the distance on the basis of one transmitted pulse.

FIG. 7 is a waveform diagram for explaining the variation of the level received as a function of the distance based on a sequence of transmitted pseudo-random pulses in accordance with the invention.

DESCRIPTION OF THE PREFERRED EMBODIMENTS

Figure 1:
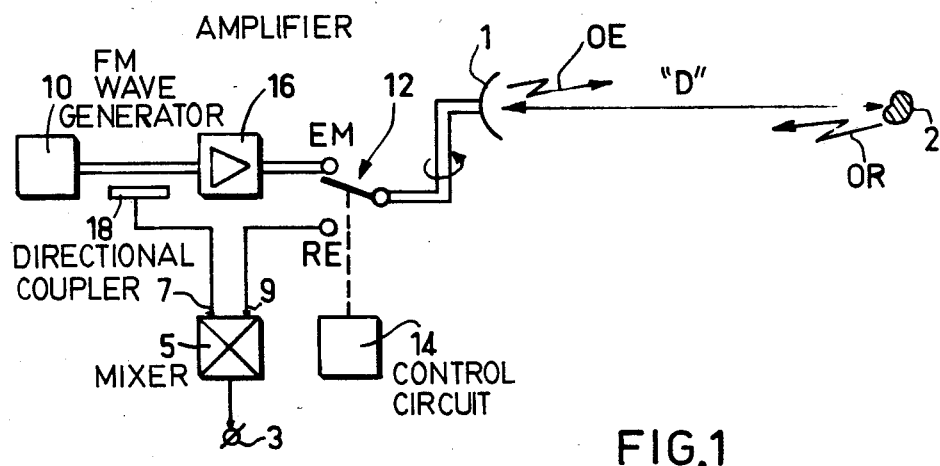
FIG. 1 shows a radar system in accordance with the invention.

The radar device shown in FIG. 1 comprises a rotary aerial 1; this aerial is used both for transmitting a wave OE and for receiving a wave OR reflected from, for example, a target 2. To simplify the explanation only one target is shown, but will be obvious that in practive there may be a plurality of targets. An information about the distance D of the target 2 appears at a terminal 3. Knowledge of the distance D on the one hand and the angle of rotation of the aerial 1 on the other hand renders it possible to locate the target 2 in space by means of display devices, not shown in the Figure. The terminal 3 is connected to the output of a mixer circuit 5. This circuit 5 has two inputs, the first input is denoted by reference numeral 7, the second one by reference numeral 9.

Figure 2:
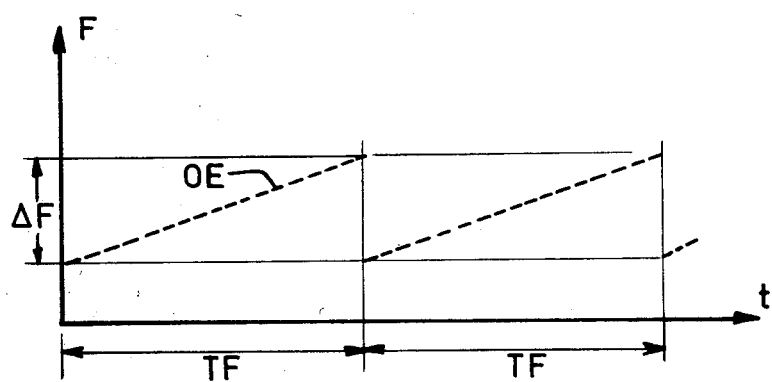
FIG. 2 shows the frequency variation of the transmitted wave.

The transmitted wave OE is a wave which is linearly frequency modulated with a sweep equal to ΔF, see FIG. 2. This frequency sweep is passed through in a period of time eual to TF. To indicate that this wave is pulsed, that is to say that it is transmitted intermittently, the curve showing the variation of the frequency F as a function of the time "t" is shown by means of a broken line. The device shown in FIG. 1, further comprises inter alia a frequency-modulated wave generator denoted by reference numeral 10, a change-over device 12 co-operating with a control circuit 14 for temporarily connecting the aerial 1 to the output of the generator 10 by means of a high-power, wideband amplifier 16, while the first input 7 of the mixer circuit 5 is connected to the output of the generator 10 by means of a sampling circuit 18 formed by, for example, a directional coupler.

The change-over device 12 has two positions EM and RE, so that when the aerial 1 is not connected to the output of the amplifier 16, it is connected to the second input 9 of the mixer circuit 5.

FIG. 3 shows a detailed embodiment of the control circuit 14.

This circuit 14 comprises a clock signal generator 20 producing signals having a very short period compared with TF; the shape of the clock signals is shown at the line "a" of FIG. 4. These signals are applied to a modulo-3 counter denoted by reference numeral 22. The state of this counter is indicated at the line "b" of FIG. 4. The wires F1 and F2 transmitting the logic signals which are representative of the state of this counter 22 are connected to first inputs of a code comparator 24. The wire F2 is also connected to the counting signal input of a modulo-"150" counter denoted by reference numeral 26; the shape of the signal transmitted by this wire F2 is shown at the line "c" of FIG. 4. The content of counter 26 shown schematically at the line "d" of FIG. 4 is used as the address code for read-only memory 30. This read-only memory includes a pseudo-random sequence formed by one hundred and fifty words of two binary elements each. These words are taken from an assembly of words: 00, 01, 10 (see line "e" of FIG. 4). So the code comparator 24 compares the code produced by the counter 22 with the word at the output of the system of read-only memories 30. The output signal of the comparator 24 controls the change-over switch 12. The shape of the control signal of the change-over device 12 is shown at the line "f" of FIG. 4.

The circuit 14 of FIG. 3 operates as follows.

At each ascending edge of the output signal of the generator 20 the state of the counter 22 changes and is increased by one step. Since the counter 22 is a modulo-3 counter, the logic signal it transmits to wire F2 takes the value "1" every three periods of the clock signal produced by the generator 20. The ascending edge of the signal transmitted by the wire F2 causes the counter 26 to be increased by one step, so that a new word appears at the output of the memory 30. From the moment there is coincidence between the content of counter 22 and this word, the control signal adjusts the change-over device 12 to the position EM. Thus, this circuit 14 defines by means of the signal transmitted over the wire F2, time periods TC (TC<<TF) and by means of the counter 22 three equal sub-periods ST1, ST2, ST3 contained within the periods of time TC and also controls setting the change-over device 12 to the position EM during one of the sub-periods ST1, ST2, ST3 of one specific periode TC, this sub-period depending on the word supplied by the read-only memory 30.

Figure 5:
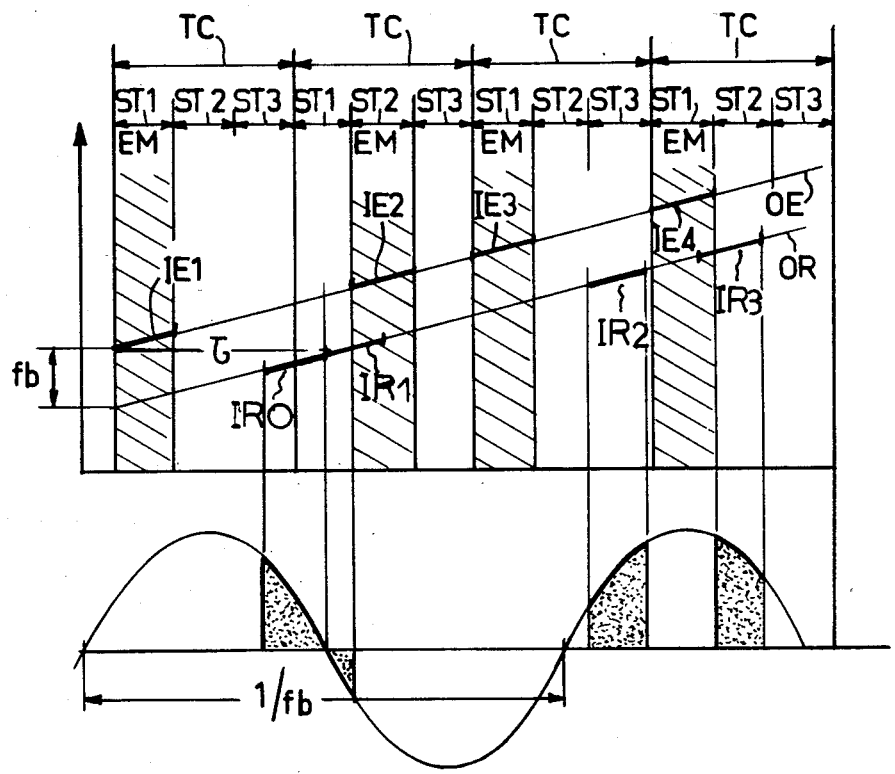
FIG. 5 is a waveform diagram for explaining the generation of a sine-wave beat signal obtained at the output of the device in accordance with the invention.

It is now possible to explain the radar system of the invention; reference is made to FIG. 5 in which a portion of the frequency variation of the frequency-modulated wave OE is shown on an enlarged scale. In each time period TC the pulses IE1, IE2, IE3, IE4 are transmitted in one of the respective equal sub-periods ST1, ST2, ST1, ST1. A wave OR reflected from a target situated at a distance D corresponds to this transmitted wave OE. This reflected wave OR is detected by the radar device after a period of time $\tau$ such that:

$$\tau = 2D/c \qquad (1)$$

wherein c is the speed of light. If this return wave OR is made to beat with a non-pulsed signal coming from generator 10, the beat frequency fb of the signal available at the output of the mixer 5 is such that:

$$fb = \tau \frac{\Delta F}{Tf} \qquad (2)$$

Taking account of the relation (1) it may be written that:

$$fb = \frac{2D}{c} \frac{\Delta F}{TF} \qquad (3)$$

Thus, the measurement of fb is also a measurement of D.

At the bottom of FIG. 5 it is shown how the sine wave of the beat signal having the frequency "fb" is generated. This sine wave is formed by the samples of the signals resulting from beating between the local wave which is continuously applied to the first input 7 of the mixer 5 and the wave received when the change-over switch is in the position "RE". The return wave is formed by return pulses IR1, IR2 and IR3 which correspond to the respective pulses IE1, IE2 and IE3 and the pulse IR0 which corresponds to a preceding pulse IEO which is not shown in this FIG. 5.

The level of this sine wave is proportional to the width of the samples, this width varying from a maximum width equal to the width of the transmitted pulse (in the event of the pulses IRO, IR2) to a zero width (in the event in which the return pulse arrives when the change-over switch 12 is in the position EM), passing through the intermediate cases, such as those of the pulsesIR1 and IR3.

It is possible to trance the distance spectrum, that is to say the level of the sine wave as a function of the distance D of the target. To establish this spectrum the following considerations are taken as the starting point. Different pulses IR1', IR2', IR3' IR4' are represented at "a" in FIG. 6, shifted in the vertical direction for the sake of clarity. These pulses are delayed replica of a transmitted pulse IE1' corresponding to the position EM of the change-over switch 12. These different pulses IR1' to IR4' are delayed by the respective durations $\tau 1$, $\tau 2$, $\tau 3$, $\tau 4$. The pulse IE1' is followed by a further pulse IE2' after a period of time TCC, the width of these pulses is constant and equal to ST.

Now the case will be considered wherein $0 \leq \tau \leq ST$, that is to say the case of the pulse IR1'; the leading edge of this pulse arrives in the region of the aerial system when the change-over switch 12 is in the position EM. The contribution of this pulse will not be taken account of until after the pulse IE1' has ended, so that the width of the sample is equal to the period of time separating the trailing edges of the pulses IR1' and IE1'; this width is consequently proportional to the delay $\tau$. The received power W also varies proportionally for targets causing these delays $\tau$. This is represented by C1 which is a portion of the curve shown at "b" in FIG. 6. This curve represents the power level received as a function of the delay $\tau$ caused by the target. The delay $\tau=0$ is positioned perpendicularly to the ascending edge of the pulse IE1'. Instead of grading the axis of the abscissa in "$\tau$" it is alternatively possible to grade it by distance since these two quantities are linked by the formula:

$$\tau = (2/c) \cdot D$$

Now the case will be considered in which $ST \leq \tau \leq TCC - ST$. This case corresponds to the situation where the total transmitted pulse is received when the change-over switch is in the position RE. This is represented by the pulses IR2' and IR3' at the line "a" of FIG. 6. The pulse IR2' is a first borderline case, its leading edge coincides with the trailing edge of the pulse IE1' while the trailing edge of the pulse IR3', second borderline case, coincides with the leading edge of the pulse IE2'. All the pulses which are comprised between thee two borderline cases are received with a constant power; this is shown by the portion C2 at "b" in FIG. 6.

Finally, the case will be considered in which $TCC - ST \leq \tau \leq TCC$; this is illustrated by the pulse IR4'. In this case, the longer the delay $\tau$ becomes the more the received pulse will be masked by the pulse IE2'. The power will then decrease; this is represented at "b" by the portion of the curve C3.

If the delay becomes still longer, the power will increase until it has obtained its maximum value and will decrease when a new pulse approaches.

FIG. 7 shows how the curve of the received power as a function of the distance may be established. At the line "a" of this FIG. 7 a train of pulses IE1, IE2, IE3, IE4, IE5, . . . is shown whose width is equal to TC/3 and which are located in a pseudo-random manner on one of the sub-periods of time ST1, ST2, ST3 of one specific time period. Thus, the pulse IE1, is located in the sub-period ST1, the pulse IE2 in the sub-period ST2, the pulse IE3 in the sub-period ST3 . . . ; these pulses correspond to the fact that the change-over switch is in the position EM. In order to obtain the level W of the received power as a function of the distance D of the targets, which is shown as line "e" of FIG. 7, the level obtained by each pulse in the manner shown in FIG. 6 must be composed. The contribution of each one of these pulses IE1, IE2, IE3 is shown at the respective lines "b", "c", "d". In "e" it will be seen that then there are no longer distances for which the received level is zero.

A device in accordance with the invention for which $\Delta F = 50$ MHz $TC = 1$ /μs, $TF = 7$ ms and for which the counter 26 has 150 positions measures distances from 400 m to 20 km, the frequency of the signal at the terminal 3 varying from fb ~ 17 kHz for D = 400 m and fb ~ 1 MHz for D = 20 km.

What is claimed is:

1. In a radar system of the kind operating by means of pulsed frequency modulated waves and comprising an aerial system for directing such waves to at least one target located at a distance D and for receiving the waves reflected from this target, a mixer circuit having a first input for receiving a local signal, a second input for receiving the reflected signal received by the aerial system and an output for producing an information about the distance D, a frequency-modulated wave generator producing an output signal having a periodic linear sweep in frequency, and a change-over device cooperating with a control circuit for (i) temporarily connecting the aerial system to the generator and for thus producing the pulsed frequency-modulated waves while the first input of the mixer circuit receives a signal which is derived from the output signal of the said generator, and (ii) disconnecting the second input of the mixer circuit from the aerial system while the aerial system is connected to the generator; the improvement characterized in that the control circuit comprises means for connecting the aerial system to the output of the frequency-modulated wave generator during one of a plurality of equal fixed time sub-intervals selected in a pseudo-random manner within each of successive time intervals of equal fixed duration.

2. An improved radar system as claimed in claim 1, in which there are three of said equal sub-intervals, the aerial system being connected to the frequency-modulated wave generator during one of such sub-intervals selected in a pseudo-random manner, and in which there are a plurality of said successive time intervals during the period of the frequency sweep of the output signal produced by said generator.

* * * * *